Figure 1:
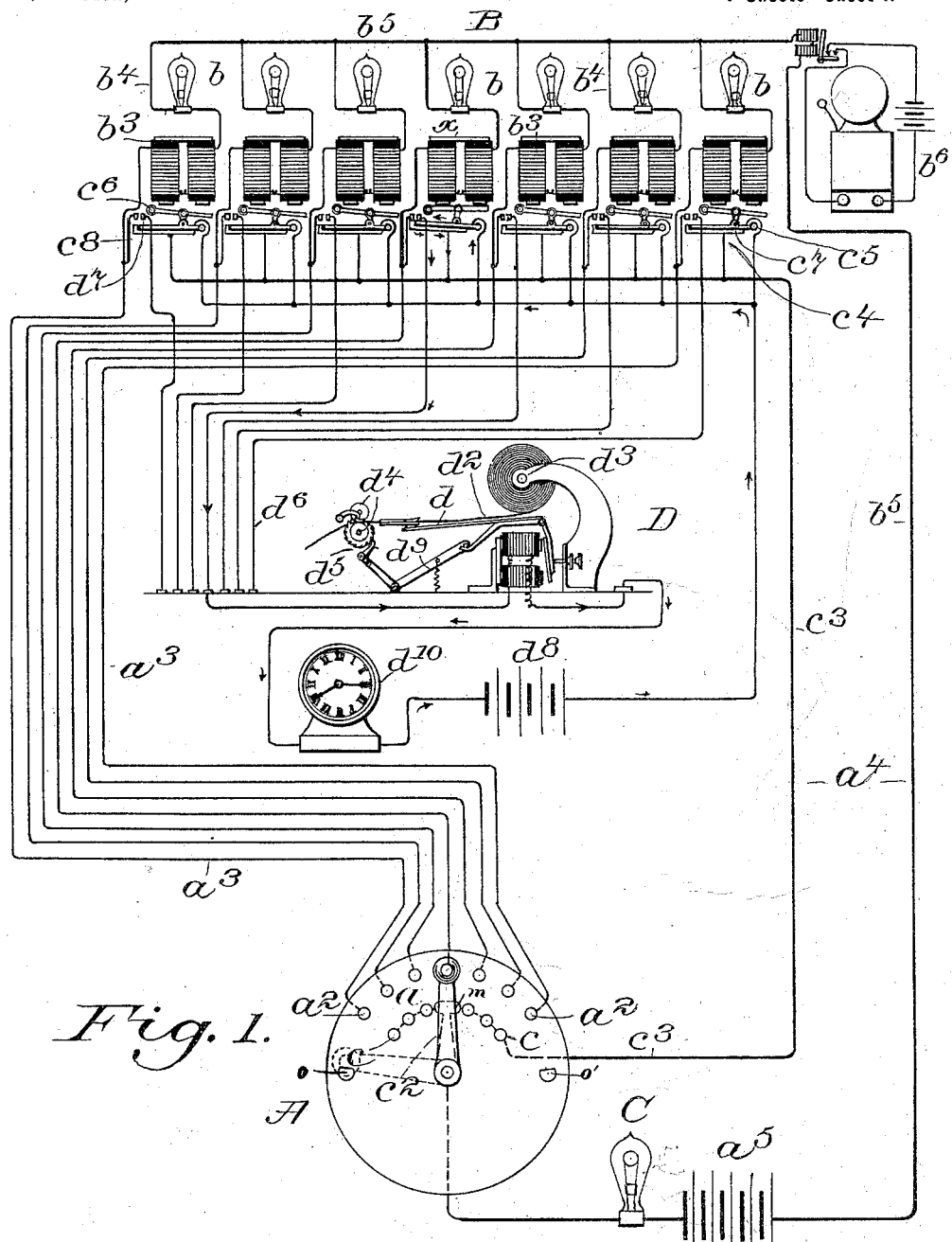

No. 611,638. Patented Oct. 4, 1898.
H. G. LEOPOLD.
SIGNAL APPARATUS.
(Application filed Sept. 3, 1897.)
(No Model.) 4 Sheets—Sheet 1.

WITNESSES:
Alfred O. Blaisdell
Chas. A. Webb.

INVENTOR
Harry G. Leopold.
BY
Geo. H. Benjamin
ATTORNEY

No. 611,638. Patented Oct. 4, 1898.
H. G. LEOPOLD.
SIGNAL APPARATUS.
(Application filed Sept. 3, 1897.)
(No Model.) 4 Sheets—Sheet 2.

WITNESSES:
Alfred O. Blaisdell
Chas. A. Webb.

INVENTOR
Harry G. Leopold.
BY
Geo. H. Benjamin
ATTORNEY

No. 611,638. Patented Oct. 4, 1898.
H. G. LEOPOLD.
SIGNAL APPARATUS.
(Application filed Sept. 3, 1897.)
(No Model.) 4 Sheets—Sheet 3.
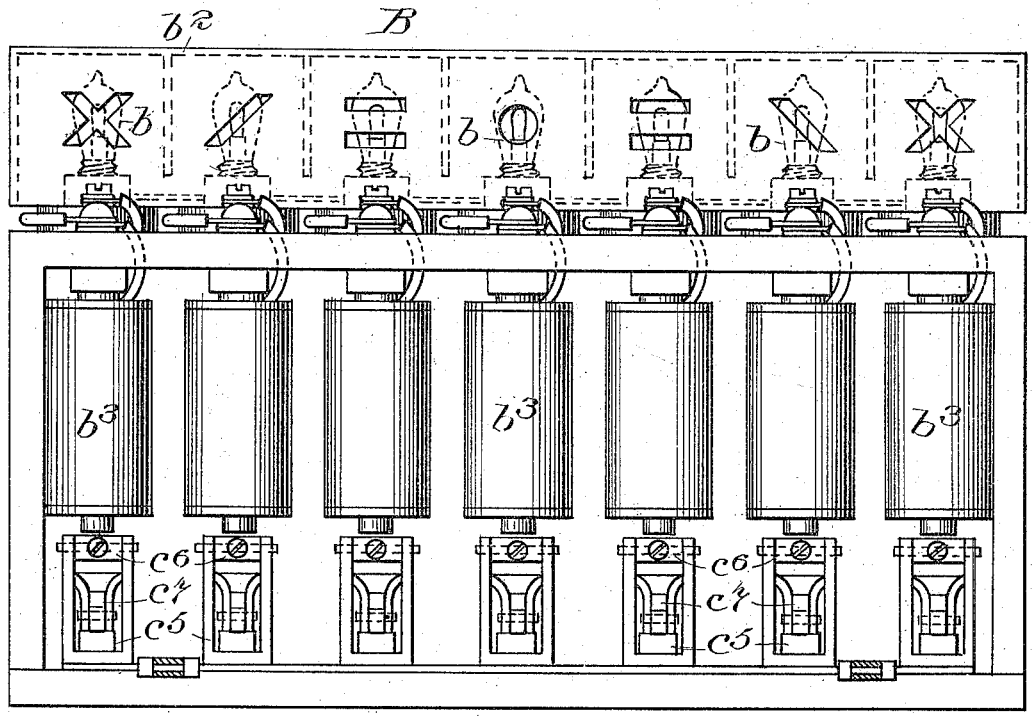
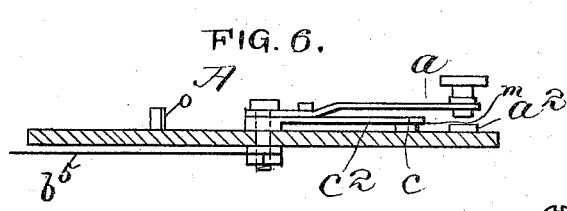
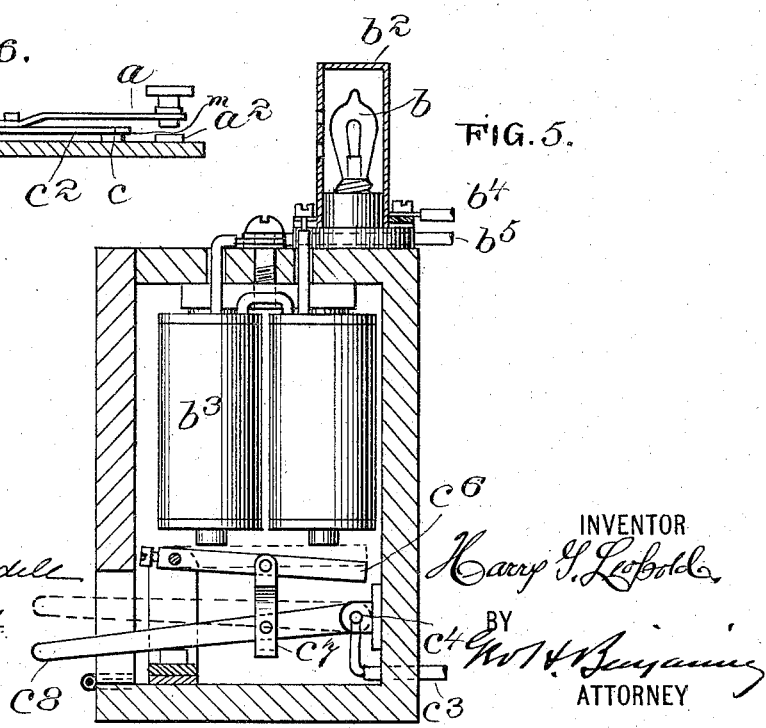

No. 611,638. Patented Oct. 4, 1898.
H. G. LEOPOLD.
SIGNAL APPARATUS.
(Application filed Sept. 3, 1897.)

(No Model.) 4 Sheets—Sheet 4.

WITNESSES:
Alfred O. Blaisdell
Chas. A. Webb.

INVENTOR
Harry G. Leopold,
BY
Geo. H. Benjamin
ATTORNEY

UNITED STATES PATENT OFFICE.

HARRY GERARD LEOPOLD, OF NEW YORK, N. Y., ASSIGNOR OF ONE-HALF TO ERWIN LAVENS, OF SAME PLACE.

SIGNAL APPARATUS.

SPECIFICATION forming part of Letters Patent No. 611,638, dated October 4, 1898.

Application filed September 3, 1897. Serial No. 650,451. (No model.)

*To all whom it may concern:*

Be it known that I, HARRY GERARD LEOPOLD, a citizen of the United States, residing at New York, (Brooklyn,) State of New York, have invented new and useful Improvements in Signal Apparatus, of which the following is a specification.

My invention relates generally to signaling apparatus, and more particularly to that class adapted for use as an engine-room telegraph.

It is customary in the navigation of vessels to employ a system of signals as a means of communication between the officer in charge and the engineer. In the transmission and execution of these order-signals it is found that mistakes occur with alarming frequency, notwithstanding the care exercised in the manipulation of the apparatus and the close attention given by the engineer, and as such misunderstandings are likely to create confusion and possibly result in collisions involving extensive damage or loss of life it therefore becomes highly important that a system be devised which shall insure greater accuracy in operation than has heretofore been the case. With regard to alleged mismanagement of vessels, ordinarily investigation tending to determine the facts and place the responsibility is often made extremely difficult, mainly by reason of the conflicting testimony in reference to the signals given and in rendering a decision. It becomes necessary, owing to the lack of reliable evidence, to resort to theory based upon assumptions of more or less doubtful nature, which method of procedure may obviously impose an unjust penalty.

In view of the foregoing it is the object of the present invention to increase the efficiency of such systems by eliminating all uncertainty and to effect the transmission of signals in a manner to render mistakes or confusion improbable, if not impossible.

With this object in view the invention consists in a signal-controller or transmitting-switch conveniently placed to be operated by the pilot or other officer directing the movements of the vessel; furthermore, in a receiving or signal station located in the engine-room and comprising requisite signals, which may be either of the visual or audible class, or both, arranged to be individually influenced by the controller and discontinued by the engineer as an acknowledgment to the sender that the order transmitted has been received and executed; furthermore, in a telltale-indicator, in the form of either a single signal or a series, located in proximity to the controller and operating simultaneously with each of those of the receiving-station to represent both the condition of the line and the engineer's response, and, finally, in a recorder accessible or inaccessible to the officers and ship's crew and comprising time and signal indicating mechanism electrically connected to operate in conjunction with the signal apparatus and automatically record a timed schedule of the transmission and receipt of orders.

The main points of invention lie, first, in a shunted controller or transmitting-switch by which any one of a series of order-signals located at a distance may be separately influenced; second, in a series of automatic switches corresponding in number with the order-signals and adapted to be independently operated by the transmitting-switch and for the purpose of closing the main circuit and maintaining the closure of said circuit through an order-signal located at a distance, also through a telltale-signal located at the sending-station and, if desired, through a device which records the nature of the signal, &c.; third, in a telltale-signal located at the sending-station adapted to be operated and maintained in operation with each or any of the order-signals located at a distance and which device indicates the operation of the distant signal and, if desired, the character of the distant signal, and also serves to indicate that the distant-signal order has been noted by the engineer and obeyed; fourth, in a recorder adapted to indicate the character of the signal transmitted, time of its transmission, execution, &c., and, finally, in various minor features to be hereinafter described and claimed.

In the accompanying drawings like letters indicate corresponding parts in the several views.

Figure 2:
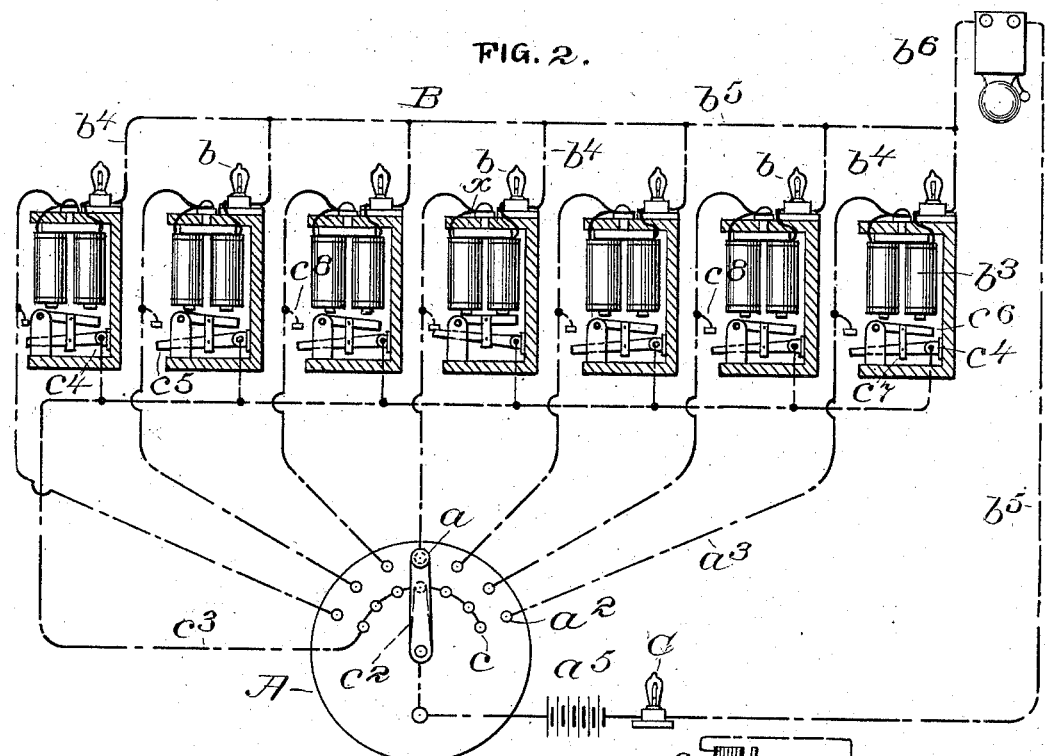
Figure 3:
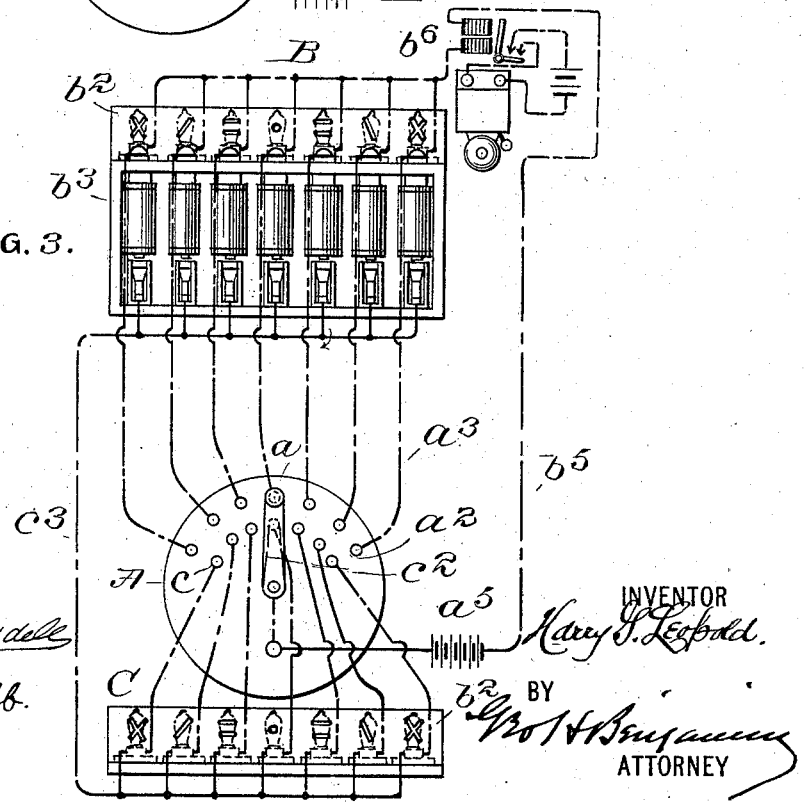
Figure 7:
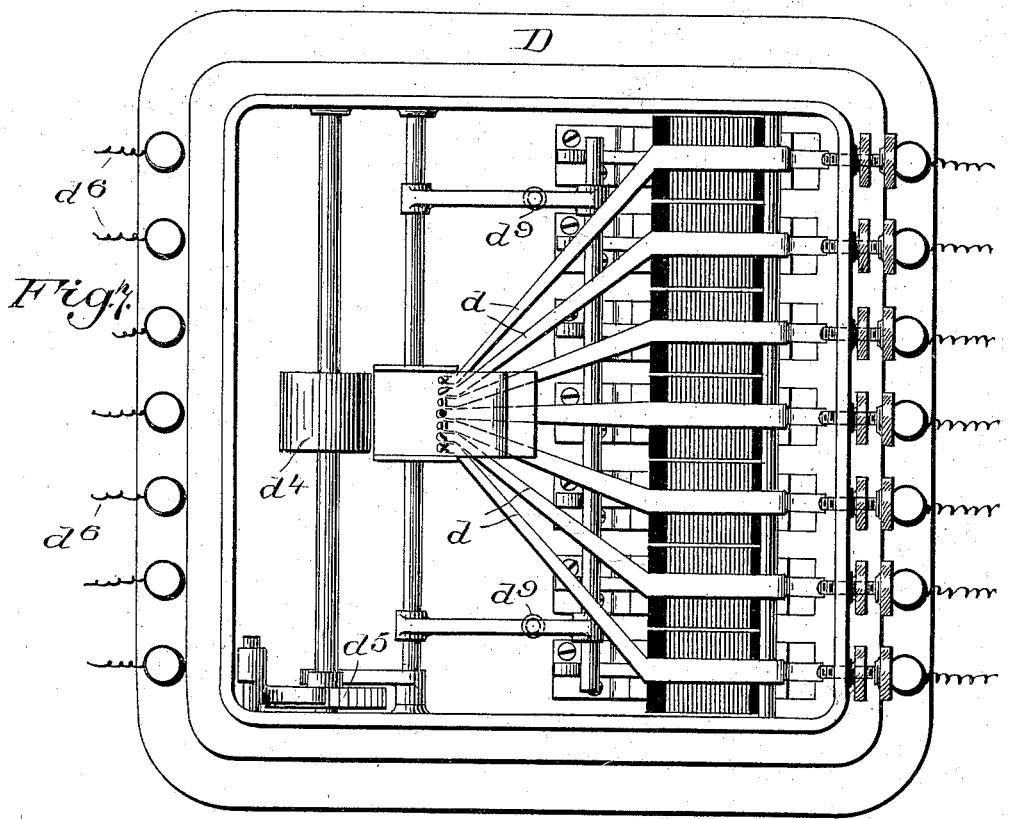
Figure 8:
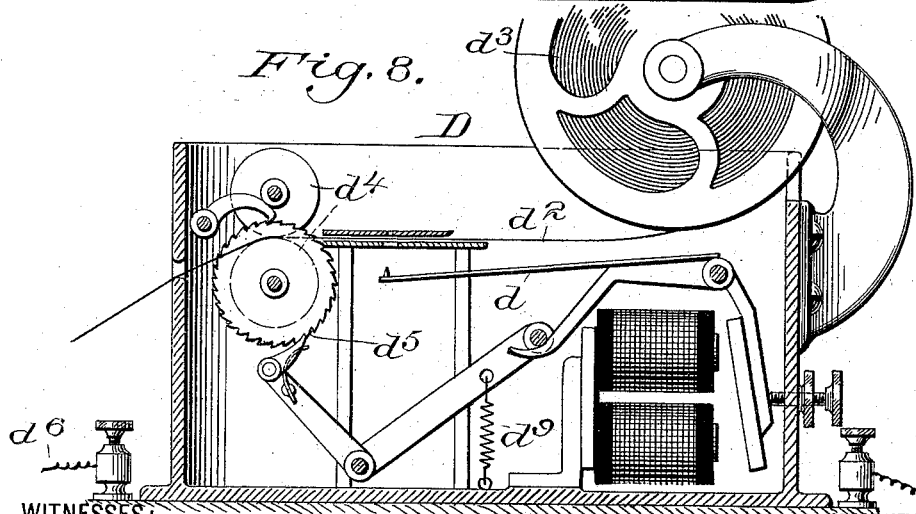

Figure 1 is a view in diagram of one embodiment of the invention, showing the same in its entirety. Fig. 2 is a similar view of a modification of the apparatus as arranged when operating without a recorder. Fig. 3 illustrates a further modification in which duplicate series of signals are employed. Fig. 4 is a view in front elevation of the receiver or signal apparatus proper. Fig. 5 is a sectional view thereof taken on the line 5 5 of Fig. 4. Fig. 6 is a detail sectional view of the controller or transmitter. Fig. 7 is a plan view of the recorder, and Fig. 8 is a vertical sectional view taken longitudinally thereof.

In the drawings, A represents the controller, the transmitting-switch $a$ thereof being movable through an arc terminating at the stops $o\ o'$ and including a series of contact-points $a^2$, which correspond in number and character to the signals of the code employed and constitute the terminals of shunts $a^3$ of the main circuit $a^4$, whose source of supply is represented at $a^5$. The contact-points $a^2$ lie normally out of contact with the switch-arm and are sufficiently separated to prevent bridging should the arm while depressed be swung about its pivot, thereby rendering simultaneous closing of two circuits and the resulting operation of two signals impossible.

B represents the receiving-station apparatus, which may comprise any number of lamps $b$, suitably colored and arranged, as by being placed in a casing $b^2$, Fig. 4, apertured peculiarly to represent any preferred code of signals. An electromagnet $b^3$, in series connection with a lamp, is controlled through a shunt-lead therefrom, which terminates in one of the series of contact-points $a^2$ above mentioned. Wires $b^4$ from the lamps $b$ unite in a common return-lead $b^5$ to the source of supply. In addition to the signals mentioned it is at times desirable to employ one or more of the audible class, as indicated at $b^6$, which may be connected direct in the main circuit or through the employment of a relay in a suitably-derived circuit.

C represents an indicator of the telltale order, located at the transmitting-station, as shown. This device may consist either of one lamp, Fig. 1, or of a number, Fig. 3, corresponding with the signals proper and connected in series in the main circuit. A second series of contacts $c$, radially alined with the contact-points $a^2$, are adapted to be successively engaged by an arm or brush $c^2$, formed in part and moving with the transmitting-switch. This arm, being in the form of a downward-acting spring, lies normally in contact with one or the other of the points $c$, and thereby maintains a metallic circuit in which the magnet at the receiving-station, the signal at the same station, and the telltale-signal at the transmitting-station are included in series and maintained visually or audibly in operation, as will be explained. A lead $c^3$, joining these points, is connected at $c^4$ with pivoted lever-arms $c^5$, which latter receive motion from the armatures $c^6$ of the lamp-magnets through the connecting-links $c^7$. For obvious reasons, that will be fully appreciated upon a proper understanding of the apparatus as a whole, the contact between the brush $c^2$ and the series of connected contact-points $c$ must not be broken as the brush jumps from one to a succeeding point in moving over said series of points. Therefore I have provided an integral contact-shoe $m$ at the end of brush $c^2$, which is sufficiently long to bridge any two points. It is obvious, however, that a single arc-shaped strip may replace the series of points $c$, if desired, in which case said shoe would of course not be necessary. Branches $c^8$, constituting the terminals of the shunt-leads at the receiving-station, terminate in proximity to these pivoted arms and lie normally out of contact therewith. The operation of the circuit just described is as follows:

It will be apparent, in view of the foregoing description and upon an inspection of the drawings, that the apparatus comprises a main circuit, (including wire $c^3$ and wire $a^4$;) that this circuit is open at the operating instrument when the apparatus is not in operation, the compound switch (comprising the controller-switch $a$ and the brush $c^2$) being thrown around against one of the stops $o\ o'$ and closed at this point when said compound switch is manipulated to bring its brush $c^2$ into contact with the series of points $c$; that the ends of wires $c^3$ and $a^4$, remote from the operating instrument, each comprises subdivisions, the terminals of corresponding subdivisions of these wires being adapted to be connected by switches $c^5$, controlled by electromagnets, one of which is arranged in each subdivision of wire $a^4$, and that the operative connection between each of said magnets and the terminal of wire $a^4$ at the operating instrument is provided through one of the series of shunts $a^3$ and the switch $a$. (See Fig. 6.) Therefore, assuming the circuit to be broken at any of the switches $c^5$, and also at the operating instrument, the compound switch at this point being, for instance, in the position indicated in Fig. 1 in dotted lines, when said compound switch is thrown around, so that its brush $c^2$ touches the series of contacts $c$, the main circuit will be closed at the break therein at this point; but nothing further will be accomplished until having selected one of the signaling devices to be affected the operator depresses the switch $a$, thereby closing the corresponding shunt-circuit at the break therein at the operating instrument and energizing the magnet, which automatically closes (by means of the switch contiguous to the signaling device affected) the other break in the main circuit. Having so thrown the signaling device into operation, the operator need not continue the depression of the switch $a$, but may immediately permit its withdrawal without thereby again throwing out of operation the signaling devices affected, for both openings in the main circuit are still closed and will remain so until the receiver manually breaks the circuit at the signaling device or until the operator manually throws the compound switch out of contact with the connected points c. This operation has not only affected the signaling device or devices, but has also operated the telltale device. Having received the message, the receiver may acknowledge the same by again breaking the circuit by manually opening the switch of the signal device affected, and this will be indicated by the telltale device. Should the operator desire to countermand an order for any reason, he also may break the circuit instantaneously by throwing the compound switch completely out of range, with the contact-points c against one of the stops o o'.

D represents the recording instrument, which may be of any suitable or well-known construction adapted for use in either the main or a local circuit, but preferably comprises a series of electromagnetically-operated type-bars $d$, corresponding in number and character to the signal-signs employed at the receiving-station and operating separately upon a traveling tape $d^2$ to mark or puncture the same when influenced by their respective magnets. The tape from reel or drum $d^3$ passes between feed-rolls $d^4$ and is given a step-by-step motion by means of a ratchet-feed $d^5$, actuated by the type-bars. Each of the type-bar magnets has a lead $d^6$ therefrom, terminating at the receiving-station in a contact-point $d^7$, which is designed, when engaged by the adjacent lever-arm $c^5$, to close a circuit from a source of supply $d^8$ through the corresponding type-bar magnet, and thereby energize the latter, causing the bar to act upon the tape and indicate the character of the signal operated. The type-bars are retracted by springs $d^9$, which also serve to actuate the feed-ratchet and advance the tape the required distance. The recorder-circuit includes a suitable time movement—such as a stop-clock $d^{10}$ or a time-printing clock—either of which would be electrically influenced and connected to interrupt the flow of current at regular intervals—as, for example, every quarter of a second—and the recorder, in responding to each make and break of the circuit, will then indicate a timed series of characters corresponding to the signal influenced. This action continues during the period of operation of the signal, and upon depressing the lever-arm to discontinue the latter the recorder-circuit will be at the same time broken. As shown in Fig. 2, this instrument may be dispensed with, if desired, without necessitating alteration of the signal apparatus described.

Having thus described my invention, what I claim is—

1. The combination of a main circuit open at two points therein, a signaling apparatus and a telltale device located in one member of said circuit, an electrically-actuated circuit-closer located in said member of the circuit and at one of the openings in the latter, a shunt connected at one of its ends to said member of the main circuit through said circuit-closer and terminating at its other end in proximity to the other opening in said main circuit, a normally open switch adapted to connect the proximating terminals of said member of the main circuit and shunt, and a manually-operated circuit-closer for said other opening in the main circuit, substantially as described.

2. The combination of a main circuit open at two points therein, a signaling apparatus and a telltale device located in one member of the said circuit, an electrically-actuated circuit-closer located in said member of the main circuit and at one of the openings in the latter, a shunt connected at one of its ends to said member of the main circuit through said circuit-closer and terminating at its other end in proximity to the other opening in said main circuit, and a normally open switch and a manually-operated circuit-closer commonly connected to the terminal of said main-circuit member at said other opening, the former being adapted to connect said terminal with the proximate terminal of the shunt and the latter being adapted to close said other opening in the main circuit, substantially as described.

3. The combination of a main circuit open at two points therein, a signaling apparatus comprising signaling devices that are connected to one of the members of said main circuit, a telltale device located in said member of the main circuit, an electrically-actuated circuit-closer connected to each signaling device and situated at one of the openings in the circuit, a series of shunts each connected at one of its ends to said member of the main circuit through a corresponding circuit-closer and terminating at its other end in proximity to the other opening in the main circuit, and a normally open switch and a manually-operated circuit-closer commonly connected to the terminal of said main-circuit member at said other opening, the former being adapted to connect said terminal with a proximate terminal of one of the series of shunts and the latter being adapted to close said other opening in the main circuit, substantially as described.

4. The combination of a main circuit open at two points therein, a signaling apparatus comprising signaling devices that are connected to one of the members of said main circuit, a telltale device located in said member of the main circuit, an electrically-actuated circuit-closer connected to each signaling device and situated at one of the openings in said circuit, a series of shunts each connected at one of its ends to said member of the main circuit through a corresponding circuit-closer and terminating at its other end in proximity to the other opening in the main circuit, and a normally open retractile switch and a manually-operated circuit-closer pivotally mounted for simultaneous rotary movement and connected to the terminal of said main-circuit member, the former being adapted to connect said terminal with a proximate terminal of one of the series of shunts and the latter being adapted to close said other opening in the main circuit, substantially as described.

5. The combination of a main circuit open at two points therein, a signaling apparatus comprising signaling devices that are connected to one of the members of said main circuit, a telltale device located in said member of the main circuit, an electrically-actuated circuit-closer connected to each signaling device and situated at one of the openings in said circuit, a recording apparatus, an electrical circuit containing the same and having one of its terminals connected to each of the circuit-closers and the other of its terminals situated in operative contiguity thereto, said circuit-closers being adapted to close the circuit for the recording apparatus as well as the main circuit at said opening, a series of shunts each connected at one of its ends to said member of the main circuit through a corresponding circuit-closer and terminating at its other end in proximity to the other opening in the main circuit, and a normally open retractile switch and a manually-operated circuit-closer pivotally mounted for simultaneous rotary movement and connected to the terminal of said main-circuit member, the former being adapted to connect said terminal with a proximate terminal of one of the series of shunts and the latter being adapted to close said other opening in the main circuit, substantially as described.

6. In a signaling system, the combination of a controller, a signaling-circuit, a series of order-signals located at a distance and in shunt relation to said circuit; a telltale device included in said circuit, and located at the sending-station; an open circuit around the controller; a recording device and a series of devices corresponding in number with the order-signals and adapted to be actuated by the current traversing the signal-circuit to close said open circuit around the controller and energize the recording device.

In testimony whereof I affix my signature in the presence of two witnesses.

HARRY GERARD LEOPOLD.

Witnesses:
GEO. H. BENJAMIN,
J. E. PEARSON.